A. B. JOHNSON.
AUTOMATIC REGULATING VALVE.
APPLICATION FILED MAY 20, 1919.
1,392,334.
Patented Oct. 4, 1921.
2 SHEETS—SHEET 1.
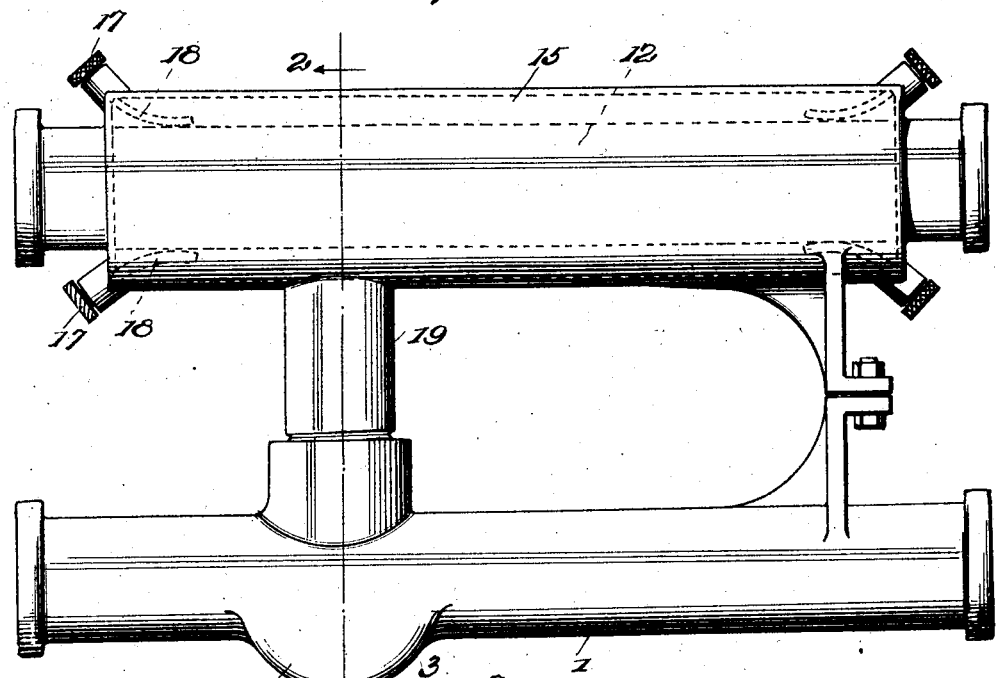
Inventor
A. B. Johnson
by Lacey & Lacey,
Attorneys.

A. B. JOHNSON.
AUTOMATIC REGULATING VALVE.
APPLICATION FILED MAY 20, 1919.
1,392,334.
Patented Oct. 4, 1921.
2 SHEETS—SHEET 2.
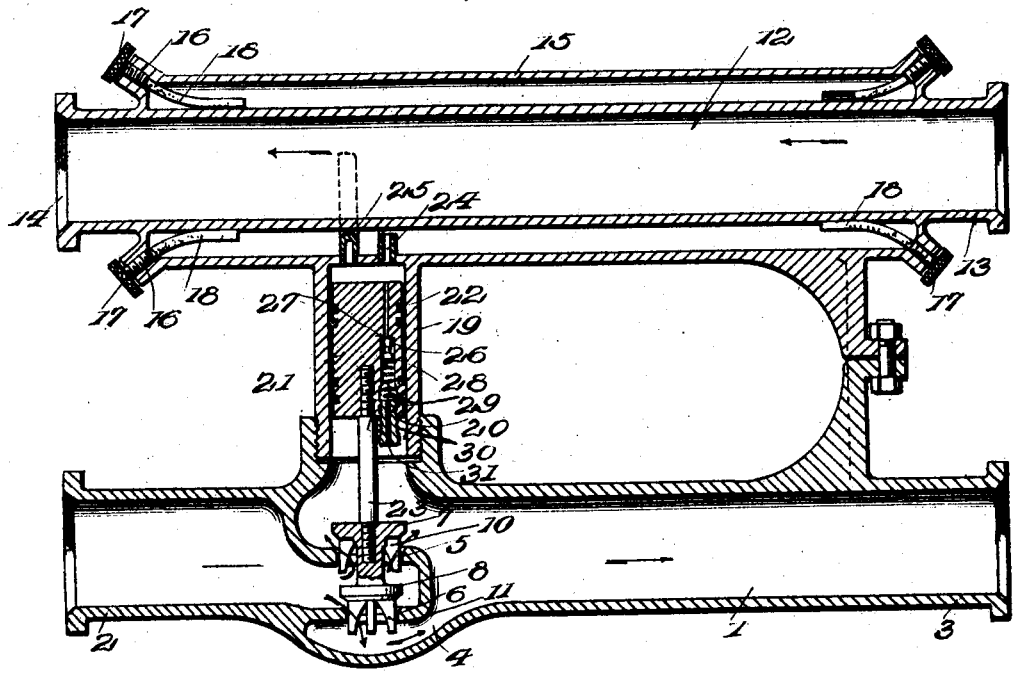
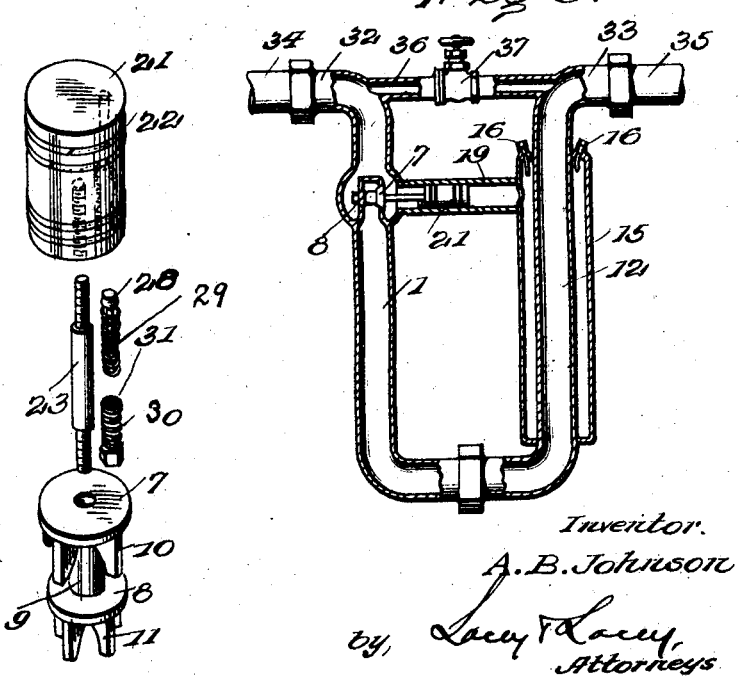
Inventor.
A. B. Johnson
by, Lacey & Lacey,
Attorneys

UNITED STATES PATENT OFFICE.

ARTHUR B. JOHNSON, OF THE UNITED STATES NAVY.

AUTOMATIC REGULATING-VALVE.

1,392,334.     Specification of Letters Patent.     Patented Oct. 4, 1921.

Application filed May 20, 1919. Serial No. 298,447.

*To all whom it may concern:*

Be it known that I, ARTHUR B. JOHNSON, a citizen of the United States, ensign in the United States Navy, have invented certain new and useful Improvements in Automatic Regulating-Valves, of which the following is a specification.

This invention relates to automatic regulating valves of that type which are employed in hot water or steam heating systems.

One object of the invention is to provide a valve of this class which may be readily and conveniently installed, which will require no adjustment or attention after its installation, and which will perform its functions in a highly efficient manner.

Another object of the invention is to so construct the valve that it may be installed in any desired position without impairing its efficiency.

The valve embodying the present invention depends for its operation upon the expansion of a fluid which acts upon a member of the valve to close the said valve, and another object of the invention is to provide the said member with a safety vent whereby increased pressure resulting from abnormal expansion of the fluid will be automatically relieved.

Another object of the invention is to provide the container for the expansible fluid with a filling means designed to prevent the said member being completely filled with the fluid.

A further object of the invention is to provide means whereby when the valve is installed in a horizontal position and any abnormally high pressure is created the discharge of all of the fluid or its vapor by way of the vent above mentioned will be prevented so that the valve will never become inoperative on this account.

In the accompanying drawings:

Figure 1 is a side elevation of the valve embodying the present invention;

Fig. 2 is a vertical transverse sectional view on the line 2—2 of Fig. 1;

Fig. 3 is a vertical longitudinal sectional view on the line 3—3 of Fig. 2;

Fig. 4 is a perspective view of the valve proper and its associated parts;

Fig. 5 is a vertical sectional view illustrating the application of the invention to a steam trap.

In the drawings the numeral 1 indicates an inflow pipe at one end as at 2 for the connection of a supply pipe from the boiler and at its opposite end as at 3 for the connection of a pipe which is to lead to the radiators. Near its first mentioned end the pipe 1 is increased in diameter to form a valve case 4 and this casing is formed with upper and lower valve seats 5 and 6, respectively, located in axial alinement and defining openings through which the steam or hot water, as the case may be, may pass from one end of the pipe to the other. The seat 5 is of greater diameter than the seat 6 and a double valve is provided comprising upper and lower heads 7 and 8, respectively, connected by a stem 9. These heads are designed to seat respectively upon the seats 5 and 6 being suitably spaced so as to seat simultaneously and, of course, to open simultaneously when the valve is moved upwardly. Suitable wings 10 and 11 are provided upon the under sides of the heads 7 and 8 respectively, and engage in the openings defined by the valve seats and serve to guide the valve in its opening and closing movement, as shown in Figs. 2 and 3 of the drawings. The heads 7 and 8 are, of course, of proper diameter to fit the respective seats and, of course, the head 7 presents a greater surface area to the pressure of the steam or hot water than does the head 8 and as the pressure is against the under side of the head 7 and against the upper side of the head 8 the valve will have a normal tendency to open and remain in open position as shown in Figs. 2 and 3.

The numeral 12 indicates an outflow pipe for the steam or hot water and this pipe is formed at one end as indicated by the numeral 13 for the connection of the return pipe of the heating system and at its other end, as indicated by the numeral 14 for the connection of the stand pipe, or if desired under some conditions this last mentioned end of the pipe 12 may be connected to another or other additional radiators. This pipe 12 is provided with a jacket 15 which surrounds the said pipe and extends substantially the entire length thereof. The jacket 15 constitutes the expansion chamber in which is contained the fluid the expansion of which is to control the closing of the valve. This fluid may be any of the well known fluids employed for the purpose such for example as alcohol, ether, and the like and the same is to be introduced into the jacket 15 through suitable filling spouts at the opposite ends of the jacket. These spouts are indicated by the numeral 16 and each is in the nature of a short projecting nipple interiorly threaded to receive a threaded closure plug 17. A small tube 18 leads from the inner end of each filling spout a suitable distance into the jacket 15. In filling the jacket, the closure plugs for the two spouts at one end of the jacket are removed and the fluid is poured into the jacket through one spout, air escaping through the other. However, due to the provision of the tubes 18, the jacket cannot be completely filled and thus the presence of a space for the expansion of the fluid into vapor is provided with certainty in filling the jacket.

The jacket 15 is provided with a branch pipe 19 which, in the position of the valve shown in the drawings, leads downwardly and is threaded as at 20 into the upper end of the valve casing 4 in the pipe 1. A piston head 21 provided with piston rings or other fluid-tight devices 22 is slidably mounted in the branch 19 which is smoothly bored for this purpose. A short rod 23 is connected at its upper end to the lower end of the piston 21 and at its lower end is threaded into the head 7 of the valve proper. Thus when the piston is moved downwardly or in the direction of the valve, the valve will be moved to its seat and thus closed. The branch 19, of course, communicates with the interior of the jacket 15 and this communication may be established merely by the provision of an opening of a suitable size in the under side of the said jacket 15. It is preferable, however, that a short tube 24 be tapped or otherwise fitted into an opening in the under side of the said jacket so as to communicate with the interior of the branch 19 and with the said jacket, the tube being, as stated, relatively short and terminating, for example, just below the under side of the pipe 12. Another tube 25 is also tapped into the under side of the jacket 15 but this tube is longer and leads, for example, up into the jacket beside the pipe 12.

In order that extraordinarily high pressure may be relieved in the event abnormal expansion of the fluid in the jacket 15 occurs, the piston head 21 is formed with a vent passage 26 opening through the opposite ends of the piston and provided between its ends with a valve seat 27. A ball valve 28 is arranged within the vent and is normally held to this seat by means of a spring 29 which bears at one end against the valve and at its other end against an adjusting screw 30 which is adjustably fitted into the lower end of the vent and is provided with a vent passage 31 communicating with the vent passage 26. It will now be understood that upon the creation of an exceptionally high or dangerous pressure, the expansible fluid will pass the valve 28 and through the vent passage 26 into the pipe 1 thus relieving the pressure within the jacket.

Fig. 5 of the drawings illustrates the invention embodied in a steam trap and in this embodiment the structure is substantially the same as heretofore described, corresponding parts being indicated by like reference numerals. In this embodiment, however, the ends of the pipes 1 and 12 corresponding to the ends 2 and 14 heretofore described are turned laterally in opposite directions as indicated respectively by the numerals 32 and 33 for connection respectively with a discharge pipe 34 and the steam pipe 35. Also in this embodiment a pipe 36 extends and establishes communication between the ends 32 and 33 of the pipes 1 and 12 and interposed in the said pipe 36 is a by-pass cut-off valve 37.

Having thus described the invention, what is claimed as new is:

1. In a regulating valve, a fluid inflow pipe, a fluid outflow pipe, a jacket upon one of said pipes for containing a heat expansible fluid, a branch establishing rigid connection between and communication with the other pipe and the jacket, a valve in the last-mentioned pipe for controlling the flow through the pipes, a fluid pressure means in the said branch for controlling the valve and actuated through the expansion of the fluid in the said jacket, and a valved vent in the said means.

2. In a regulating valve, a fluid inflow pipe, a fluid outlet pipe, a jacket surrounding one of said pipes for containing a heat expansible fluid, a plurality of filling spouts in the ends of the jacket, a tube extending inwardly from each spout into the jacket, a valve in one of the pipes for controlling the flow through both pipes, and a fluid pressure means for controlling the valve and actuated through the expansion of the fluid in the said jacket.

3. In a regulating valve, a fluid inflow pipe, a fluid outflow pipe, a jacket upon one of said pipes for containing a heat expansible fluid, a branch pipe extending between and communicating with the other of said pipes and the jacket, a valve for controlling the flow through the latter pipe, a fluid pressure means in said branch for controlling the valve and actuated through the expansion of the fluid in the said jacket, a pipe extending and establishing communication between the intake end of the inflow pipe and the outlet end of the outflow pipe, and a cut-off by-pass valve interposed in said connected pipe.

In testimony whereof I affix my signature.

ARTHUR B. JOHNSON. [L. S.]